United States Patent
Paine et al.

(10) Patent No.: US 10,262,036 B2
(45) Date of Patent: Apr. 16, 2019

(54) REPLACING PRONOUNS WITH FOCUS-SPECIFIC OBJECTS IN SEARCH QUERIES

(71) Applicant: Microsoft Technology Licensing, LLC, Redmond, WA (US)

(72) Inventors: Llewyn Elise Paine, Kirkland, WA (US); John C. Gordon, Newcastle, WA (US); Rowen Wu, Los Angeles, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 148 days.

(21) Appl. No.: 15/394,682

(22) Filed: Dec. 29, 2016

(65) Prior Publication Data

US 2018/0189354 A1    Jul. 5, 2018

(51) Int. Cl.
| | | |
|---|---|---|
| *G06F 17/30* | (2006.01) | |
| *G06F 3/01* | (2006.01) | |
| *G06F 3/16* | (2006.01) | |
| *G10L 15/26* | (2006.01) | |
| *G06F 17/27* | (2006.01) | |

(52) U.S. Cl.
CPC ........ *G06F 17/30519* (2013.01); *G06F 3/013* (2013.01); *G06F 3/017* (2013.01); *G06F 3/167* (2013.01); *G06F 17/277* (2013.01); *G06F 17/3043* (2013.01); *G06F 17/30528* (2013.01); *G10L 15/26* (2013.01)

(58) Field of Classification Search
CPC combination set(s) only.
See application file for complete search history.

(56) References Cited

U.S. PATENT DOCUMENTS

| | | |
|---|---|---|
| 6,917,938 B2 | 7/2005 | Shea et al. |
| 7,797,301 B1 | 9/2010 | Baird et al. |
| 7,895,184 B2 | 2/2011 | Murarka et al. |
| 8,024,235 B2 | 9/2011 | Mathew et al. |
| 8,041,704 B2 | 10/2011 | Cook et al. |
| 8,108,385 B2 | 1/2012 | Kraft et al. |
| 8,117,198 B2 | 2/2012 | Herlocker et al. |
| 8,271,475 B2 | 9/2012 | Hamilto et al. |
| 8,510,166 B2 | 8/2013 | Neven |

(Continued)

FOREIGN PATENT DOCUMENTS

EP    3018558 A1    5/2016

OTHER PUBLICATIONS

Sterling, Greg, "In-App Search: Great Idea, Not So Great Experience", http://searchengineland.com/app-search-great-idea-great-experience-202212, Aug. 29, 2014, 3 pages.

(Continued)

*Primary Examiner* — Van N Chow
(74) *Attorney, Agent, or Firm* — Alleman Hall Creasman & Tuttle LLP

(57) ABSTRACT

A computing device includes a logic machine and a storage machine holding instructions. The instructions are executable by the logic machine to, receive a machine-understandable representation of voice input, determine a pronoun associated with the voice input, map the pronoun to an object of user focus, generate one or more focus-specific search queries for the object of user focus, execute the one or more focus-specific search queries, and present the results of the one or more focus-specific search queries.

19 Claims, 6 Drawing Sheets

(56) References Cited

U.S. PATENT DOCUMENTS

| | | |
|---|---|---|
| 8,862,610 B2 | 10/2014 | Cheng et al. |
| 8,933,939 B2 | 1/2015 | Li et al. |
| 8,935,269 B2 | 1/2015 | Messer et al. |
| 9,317,113 B1 | 4/2016 | Karakotsios et al. |
| 2005/0149496 A1 | 7/2005 | Mukherjee et al. |
| 2006/0271520 A1 | 11/2006 | Ragan |
| 2014/0214785 A1 | 7/2014 | Edberg |
| 2015/0049113 A1 | 2/2015 | Rahman et al. |
| 2015/0088923 A1 | 3/2015 | Garcia-barrio et al. |
| 2016/0070439 A1 | 3/2016 | Bostick et al. |

OTHER PUBLICATIONS

Pessemier, et al., "Context-aware recommendations through context and activity recognition in a mobile environment", In Journal of Multimedia Tools and Applications, vol. 72, Issue 3, Oct. 2014, 5 pages.

Ajanki, et al., "An Augmented Reality Interface to Contextual Information", In Journal of Virtual Reality, vol. 15, Nos. 2-3, Jun. 2011, pp. 1-15.

Crook, Jordan, "Blippar augmented reality search engine raises $54 million Series D", https://techcrunch.com/2016/03/02/blippar-augmented-reality-search-engine-raises-54-million-series-d/, Published on: Mar. 2, 2016, 5 pages.

REPLACING PRONOUNS WITH FOCUS-SPECIFIC OBJECTS IN SEARCH QUERIES

BACKGROUND

In some scenarios, a computer user may want to perform a search query about a topic of interest while interacting with a computing device. For example, a user may be playing a video game executed by a gaming device, and want to learn more about a displayed object. In a typical query approach, the user has to stop playing the game and use a separate search application on the device (or another device such as a smartphone).

DETAILED DESCRIPTION

Figure 1A:
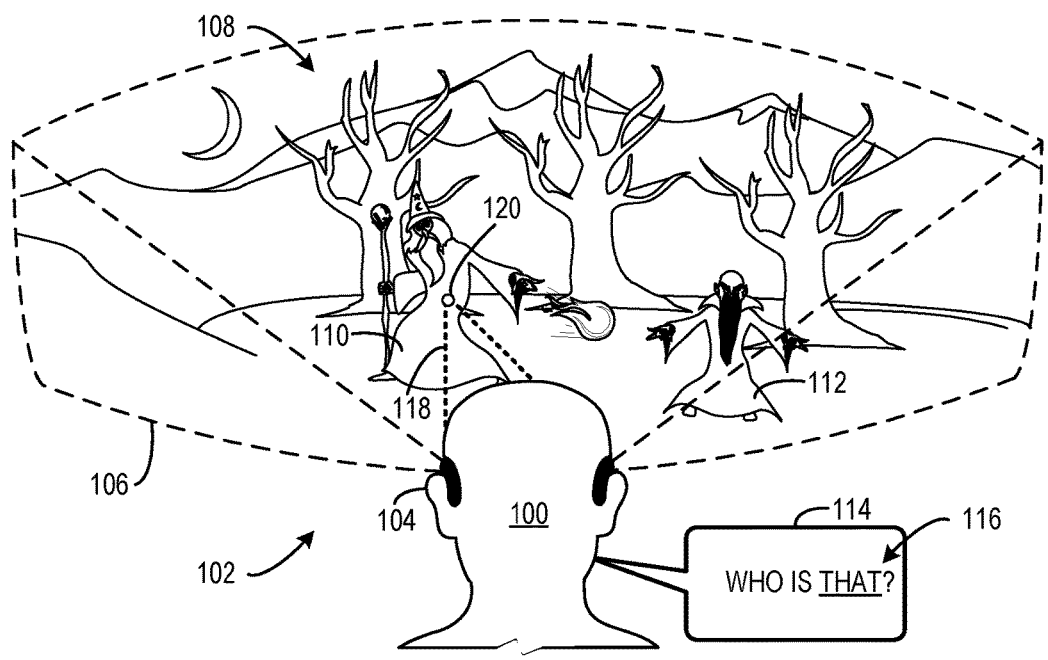
FIGS. 1A and 1B show a scenario in which a search query including a pronoun is mapped to an object of focus determined based on a user's gaze target in a focus-specific search query.

As discussed above, in order for a user to search for information about an object while interacting with a computing device, the user has to temporarily disengage from the experience (e.g., stop playing the video game) to conduct the search outside of the experience, for example by using a web-browser to perform the search with a browser-based search engine. This may be cumbersome and disruptive, because the user has to leave the experience and perform multiple steps to find the desired information.

In some cases, a user may interact with a computing device that does not support user input via a keyboard, such as a virtual-reality device or an augmented-reality device. Instead, such computing devices may receive user input via gestures and a limited set of buttons that does not include a keyboard. In some such cases, the user may not know how to perform searching using these types of user input modalities.

Moreover, in some cases, the user may not know the name of a target object or other specific information needed to conduct a useful search. As such, any search queries that are carried out using inexact search terms may provide information that the user does not find very useful.

Accordingly, the present description is directed to an approach for performing focus-specific search queries in a manner that is minimally intrusive to the interactive experience. More particularly, the present description contemplates an approach for performing focus-specific search queries by (1) determining that a user's search query includes a pronoun; (2) mapping the pronoun to an object of user focus; (3) generating one or more focus-specific search queries for the object of user focus; (4) executing the one or more focus-specific search queries; and (5) presenting the results of the one or more focus-specific search queries.

As will be explained in further detail below, the object of user focus may be inferred through various approaches based on the type of interaction with the computing device as well as the capabilities of the computing device. Furthermore, the determination of the object of focus and/or the focus-specific search query may be influenced by one or more context parameters associated with the interactive experience. By performing a focus-specific search query in which a pronoun is replaced by an inferred object of user focus, more targeted and useful information may be returned from the search.

In some implementations, focus-specific search querying may be performed at a platform level via an operating system shell. By performing focus-specific search querying at the platform level, such functionality can be provided for all sorts of different applications executed by the computing device. Further, such searches can be performed unobtrusively without requiring a user to disengage from an experience to perform the search query. Moreover, since the search is performed at the platform level, the shell may allow for the results of a focus-specific search query to be integrated into the current user experience, such as via an overlay or some other form of integration.

FIGS. 1-3 shows different example scenarios in which a search query including a pronoun is mapped to an object of focus to perform a focus-specific search query. Each of the different example scenarios demonstrate a different way in which an object of user focus may be determined, and in which a focus-specific search query may be generated for the object of focus.

Figure 1B:
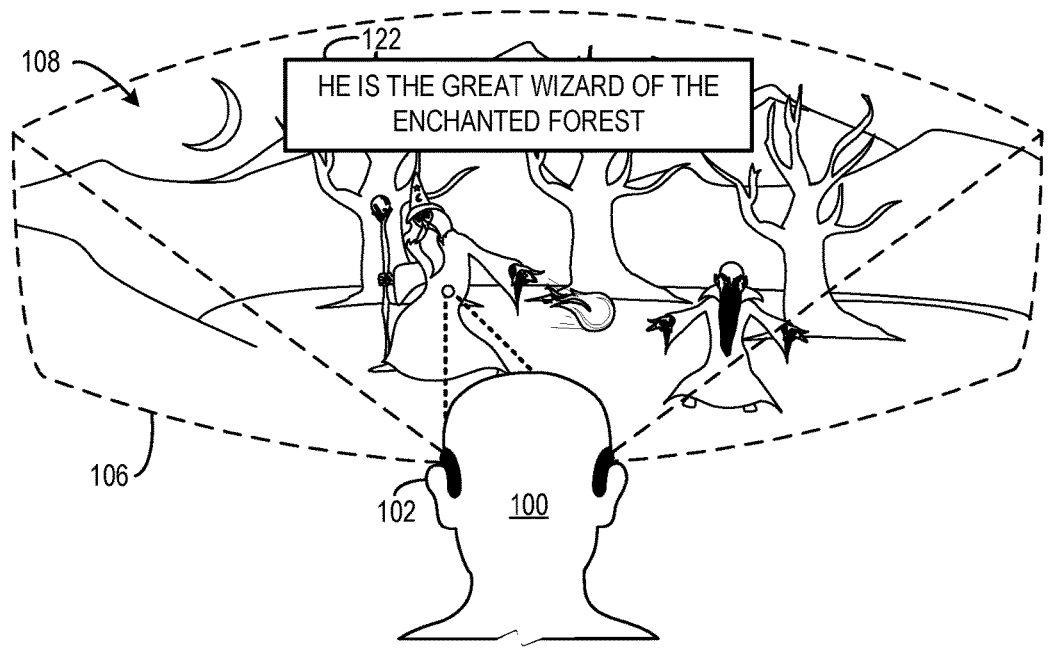

FIGS. 1A and 1B show an example scenario in which a search query including a pronoun is mapped to an object of user focus which is determined based on a user's gaze target in a focus-specific search query. FIG. 1A shows a user (or wearer) 100 wearing a virtual-reality computing device 102. The virtual-reality computing device 102 includes a near-eye display 104. The near-eye display 104 is configured to visually present a field of view (FOV) 106 of a virtual environment 108 to the user 100. The virtual environment 108 may simulate a real world and/or an imagined world, allowing the user 100 to interact with that virtualized world. For example, the virtual environment 108 may be visually presented via the near-eye display 104 by a video game executed on the virtual-reality computing device 102.

In the depicted example, the field of view 106 of the near-eye display 104 visually presents a first-person perspective of the virtual environment 108. In particular, this perspective of the virtual environment 108 depicts a great wizard 110 dueling with a wise dwarf 112 in an enchanted finest. This of course is an exemplary scene; the present discussion can be extended to any type of content presented or seen in the field of view 106 of near-eye display 104.

When the great wizard 110 and wise dwarf 112 are visually presented via the near-eye display 104, the user 100 at first does not know who these characters are or what their names are. As such, the user 100 intends to learn more about one or both of these characters. The user 100 vocalizes this intention by providing voice input 114 to the virtual-reality computing device 102. In particular, the user 100 says "WHO IS THAT?" This voice input is picked up by a microphone of the virtual-reality computing device 102. The virtual-reality computing device 102 translates the voice input 114 into a machine-understandable representation.

This allows the virtual-reality computing device 102 to identify a sentence in the form of a question, and further to parse the sentence into words in order to determine a pronoun 116 associated with the voice input 114. In particular, the virtual-reality computing device 102 identifies the pronoun "THAT" from the voice input 114.

The virtual-reality computing device 102 may be configured to identify any suitable pronoun in the voice input 114 including all, another, any, anybody, anyone, anything, both, each, either, everybody, everyone, everything, few, he, her, hers, herself, him, himself, his, I, it, its, itself, many, me, mine, more, most, much, my, myself, neither, no one, nobody, none, nothing, one, other, others, our, ours, ourselves, several, she, some, somebody, someone, something, that, their, theirs, them, themselves, these, they, this, those, us, we, what, whatever, which, whichever, who, whoever, whom, whomever, whose, you, your, yours, yourself, and yourselves, as examples.

Furthermore, the virtual-reality computing device 102 may be configured to identify any suitable part-of-speech that implicitly represents a pronoun or is a proxy for a pronoun in the voice input 114. For example, the user 102 may say, "Huh," and the device 102 may interpret the part-of-speech as "That." In another example, the user may say, "How," and the device 102 may interpret the part-of-speech as "How do I beat THAT monster?" In yet another example, the user 102 may say "What the heck," and the device 102 may interpret the phrase as "That."

Furthermore, the virtual-reality computing device 102 determines an object of user focus when the voice input 114 is received by the virtual-reality computing device 102. The virtual-reality computing device 102 is configured to track the user's gaze 118 and recognize the user's gaze target 120 on the near-eye display 104. In the depicted example, the user's gaze 118 is focused at the location of the great wizard 110, and thus the user's gaze target 120 is determined to be the great wizard 110.

In one example, the virtual-reality computing device 102 determines the user's gaze target 120 via a gaze detection machine. In particular, the gaze detection machine is configured to determine a point on the near-eye display 104 that intersects with the user's gaze 118. The user's gaze 118 may be directed to any suitable location within the field of view 106 of the near-eye display 104. Moreover, the user's gaze target 120 may be located in any suitable position within the field of view 106 of the near-eye display 104. Further, an operating system of the virtual-reality computing device 102 queries the video game to identify a virtual object that is being visually presented on the near-eye display 104 at the point of intersection (e.g., provide screen coordinate to the video game). The video game returns one or more identifying labels associated with the virtual object to the operating system to determine the gaze target 120. The labels may include any suitable information about the virtual object, such as name, type, characteristics, etc. In the depicted example, the returned tags may include "title: The Great Wizard," "object type: wizard," "power level: 5," "virtual location: enchanted forest," etc.

To facilitate straightforward identification of objects of user focus in this manner, graphical objects may be tagged in the game code/program code so that that tags can be sent to the operating system to identify an object of user focus. In one example, such graphical objects may be labeled with extensible application markup language (XAML)-based markup tags.

The virtual-reality computing device 102 is configured to map the pronoun (e.g., "THAT") 116 to the determined object of user focus (e.g., the great wizard), and generate one or more focus-specific search queries for the object of user focus. For example, the operating system of the virtual-reality computing device 102 may populate one or more focus-specific search queries with search terms based on one or more tags associated with the object of user focus received from the video game.

In some implementations, device 102 may further enhance or create additional search queries based on context parameters associated with the device interaction. Non-limiting examples of context parameters include the particular game/application showing the object of user focus (or a game state thereof); a real-world location/setting of the user 100; and additional parts-of-speech identified in the voice input 114.

In the depicted example, the virtual-reality computing device 102 generates one or more focus-specific search queries that include the tags. "The Great Wizard" and "enchanted forest" received from the video game as search terms. The virtual-reality computing device 102 may further append the search term "Middle Earth," which is the title of the video game, to the focus-specific search query.

The virtual-reality computing device 102 may generate any suitable number of focus-specific search queries. Moreover, a focus-specific search query may include any suitable number of different search terms in order to return useful information about the object of user focus.

The virtual-reality computing device 102 is configured to execute the one or more focus-specific search queries. In one example, the virtual-reality computing device 102 executes the one or more focus-specific search queries by sending these search queries to one or more search engines. The virtual-reality computing device 102 may employ any suitable search engine to execute the search queries. In some cases, the virtual-reality computing device 102 may select a particular type of search engine to execute the one or more focus-specific search queries based on the object of user focus and/or one or more context parameters.

In another example, the virtual-reality computing device 102 executes the one or more focus-specific search queries by sending these search queries to a service associated with the video game or other applications. For example, a video game service may include a database of game-related information, and the database may be queried with the focus-specific search queries to return additional information about the object of focus.

In yet another example, the virtual-reality computing device 102 executes the one or more focus-specific search queries by presenting the information on the labels associated with the object of focus that are received from the video game.

The virtual-reality computing device 102 is configured to receive the results of the executed focus-specific search queries, and present the results of the one or more focus-specific search queries to the user 100. In FIG. 1B, the virtual-reality computing device 102 visually presents, in the field of view 106, the results of the one or more focus-specific search queries in the form of a virtual object 122 overlaid on the virtual environment 108. The virtual object 122 includes text that states, "HE IS THE GREAT WIZARD OF THE ENCHANTED FOREST." The virtual object 122 may include any suitable information about the great wizard 110 to inform the user 100.

The text presented via the virtual object 122 is a non-limiting example. The results of the one or more focus-specific search queries may be presented in any suitable manner. In some cases, the results of the one or more focus-specific search queries may include still images, video clips, diagrams, text and/or other visual representations. In some cases, the results of the one or more focus-specific search queries may include a form of audio feedback, such as a voiceover clip. In any of such cases, the virtual-reality computing device 102 may present the results of the one or more focus-specific search queries to the user 100 in a minimally intrusive manner such that the user 100 does not have to disengage from experiencing the virtual environment 108.

Figure 2A:
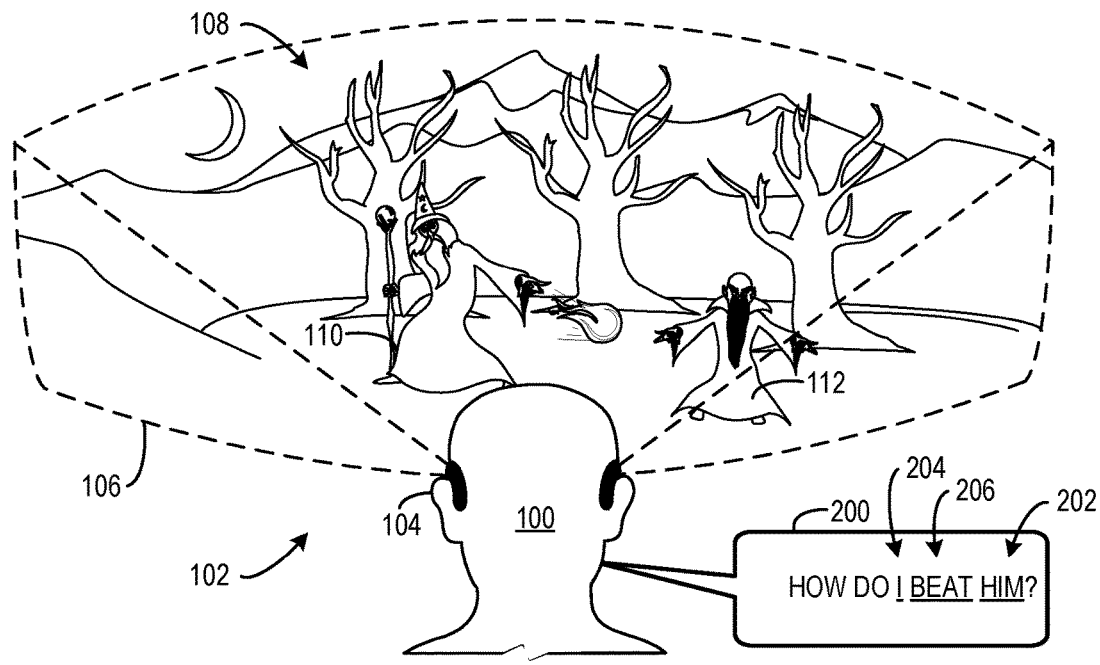
FIGS. 2A and 2B show a scenario in which a search query including a pronoun is mapped to an object of user focus determined at least partially based on another part-of-speech in the search query to generate a focus-specific search query.
Figure 2B:
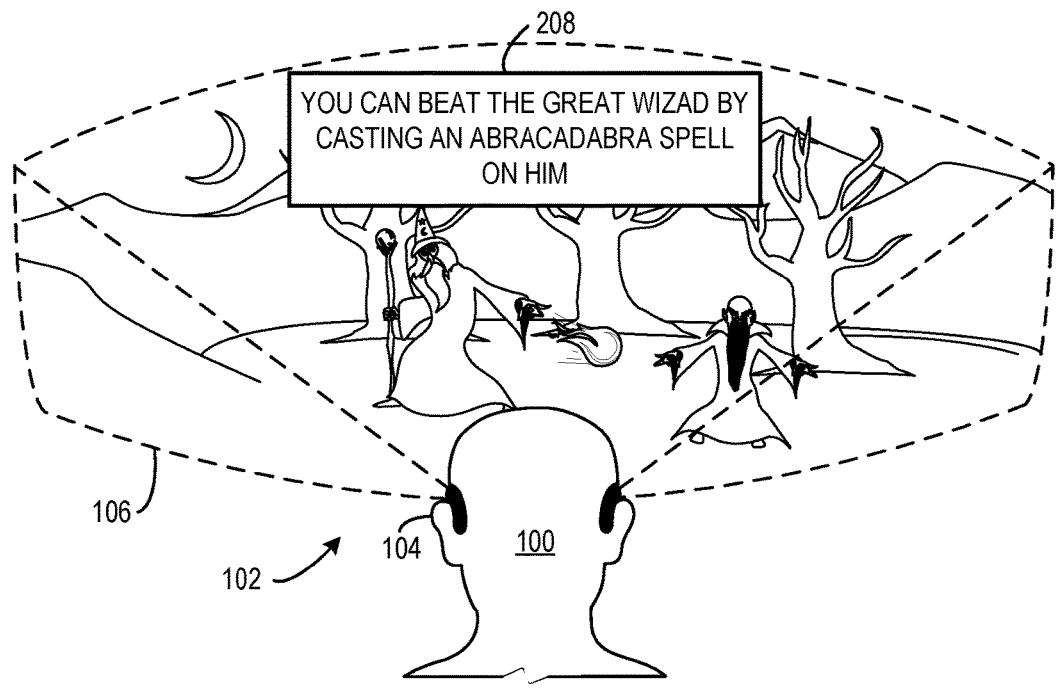

FIGS. 2A and 2B show another example scenario in which a search query includes a pronoun and a part-of-speech that disambiguates the object of user focus and/or narrows the focus of the resulting search query. In this scenario, the part-of-speech specifies a particular action related to the object of user focus. Accordingly, search queries are generated for the object of user focus and the particular action. The user 100 is wearing the virtual-reality computing device 102. The near-eye display 104 visually presents the FOV 106 of the virtual environment 108 to the user 100. In particular, the virtual environment 108 depicts the great wizard 110 dueling with the wise dwarf 112 in the enchanted forest. In this scenario, the user 100 provides voice input 200

In FIG. 2A, when the great wizard 110 and the wise dwarf 112 are visually presented via the near-eye display 104, the user 100 identifies the great wizard 110 and further recognizes that the great wizard 110 is a foe from the information presented via the virtual object 122 of FIG. 1B. As such, the user 100 wants to learn how to beat the great wizard 110. The user 100 vocalizes this by providing voice input 200 to the virtual-reality computing device 102. In particular, the user 100 says "HOW DO I BEAT HIM?" The virtual-reality computing device 102 receives, via a microphone, the voice input 114 of the user 100. The virtual-reality computing device 102 translates the voice input 200 into a machine-understandable representation, and identifies a question including pronouns 202 and 204 as well as another part-of-speech 206. In particular, the virtual-reality computing device 102 identifies the pronoun 202 as "HIM," the pronoun 204 as "I," and the part-of-speech 206 as "BEAT" from the voice input 200.

In this scenario, the virtual-reality computing device 102 identifies that the pronoun 204 refers to the user 100. Further, the device 102 uses the part-of-speech 206 to disambiguate the object of user focus that is mapped to the pronoun 202. The virtual-reality computing device 102 queries the video game to determine a game state including the various virtual objects currently being visually presented on the near-eye display 104. The video game may return a list of virtual objects including the great wizard 110, the wise dwarf 112, as well as other objects that make up the virtual environment 108, such as trees, mountains, the moon, etc. Such virtual objects may be candidates for the object of user focus.

The virtual-reality computing device 102 narrows down the list of candidates based on the pronoun 202. For example, the virtual-reality computing device 102 may determine that "HIM" refers to a male character as opposed to an inanimate object, and narrows down the list of candidates to the great wizard 110 and the wise dwarf 112. Further, the virtual-reality computing device 102 may analyze the virtual characters 110 and 112 to infer that one of them is the object of user focus. In one example, analysis includes determining which character is more prominently presented in the FOV 106, and inferring that the more prominently presented character is the object of user focus.

In another example, analysis includes determining that the wise dwarf 112 is an ally of the user 100 and the great wizard 110 is a foe of the user 100 based on tags or other game-state information provided by the video game. The virtual-reality computing device 102 may infer that the part-of-speech ("BEAT") 206 refers to the foe and not the ally. In either example of analysis, the virtual-reality computing device 102 determines that the great wizard 110 is the object of user focus.

Although the user's gaze target is not relied upon to determine the object of user focus in this example, it will be appreciated that the user's gaze target may be used to confirm the object of user focus determined based on the analysis performed by the virtual-reality computing device 102.

The virtual-reality computing device 102 maps the pronoun (e.g., "HIM") 202 to the determined object of user focus (e.g., the great wizard). The device 102 generates one or more focus-specific search queries for the object of user focus, and further narrows the search queries by including the part-of-speech ("BEAT") 206 as a search term. As one example, the virtual-reality computing device 102 may formulate a focus-specific search query that states, "How do you beat the Great Wizard in the game Middle Earth?" By including the part-of-speech 206 in the search query, the search may be narrowed and may return more targeted and useful results.

The virtual-reality computing device 102 executes the focus-specific search queries, receive results, and presents the results to the user 100. In FIG. 2B, the virtual-reality computing device 102 visually presents the results of the search queries in the field of view 106. In particular, the device 102 visually presents a virtual object 208 overlaid on the virtual environment 108. The virtual object 122 includes text that states, "YOU CAN BEAT THE GREAT WIZARD BY CASTING AN ABRACADABRA SPELL ON HIM." The virtual object 122 may include any suitable instructions that inform the user 100 about how to beat the great wizard 110.

These scenarios depict a setting in which a user interacts with a virtual-reality computing device. It will be appreciated that the focus-specific search querying concepts described herein may be broadly applicable to user interactions with other types of computing devices having different capabilities. FIGS. 3-4 show example scenarios in which a user interacts with an augmented-reality computing device configured to map a pronoun identified from voice input to an object of user focus to generate a focus-specific search query.

Figure 3A:
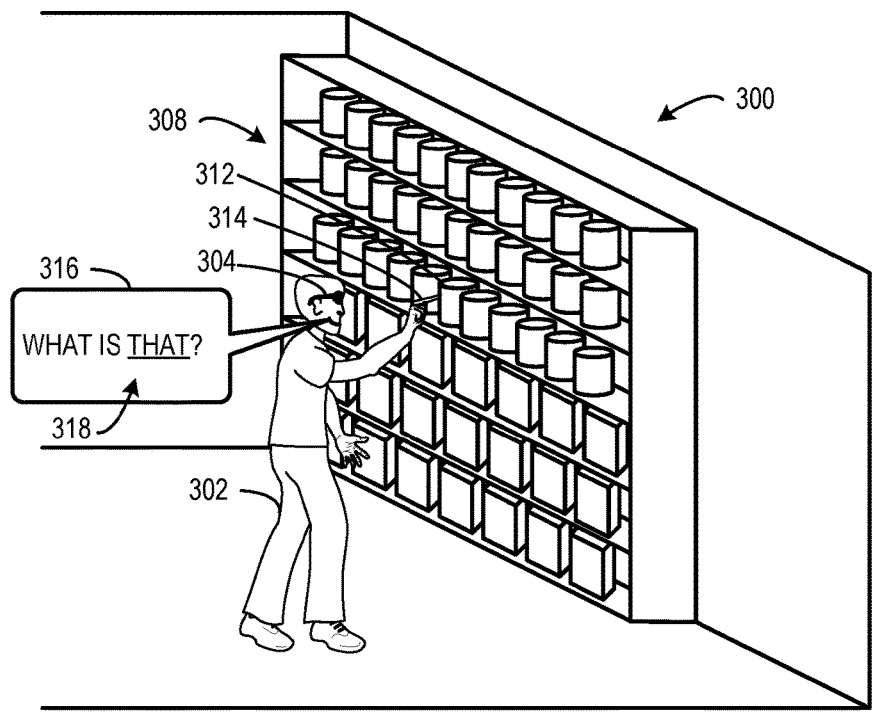
FIGS. 3A and 3B show a scenario in which a search query including a pronoun is mapped to an object of user focus determined based on a gesture performed by a user in a focus-specific search query.
Figure 3B:
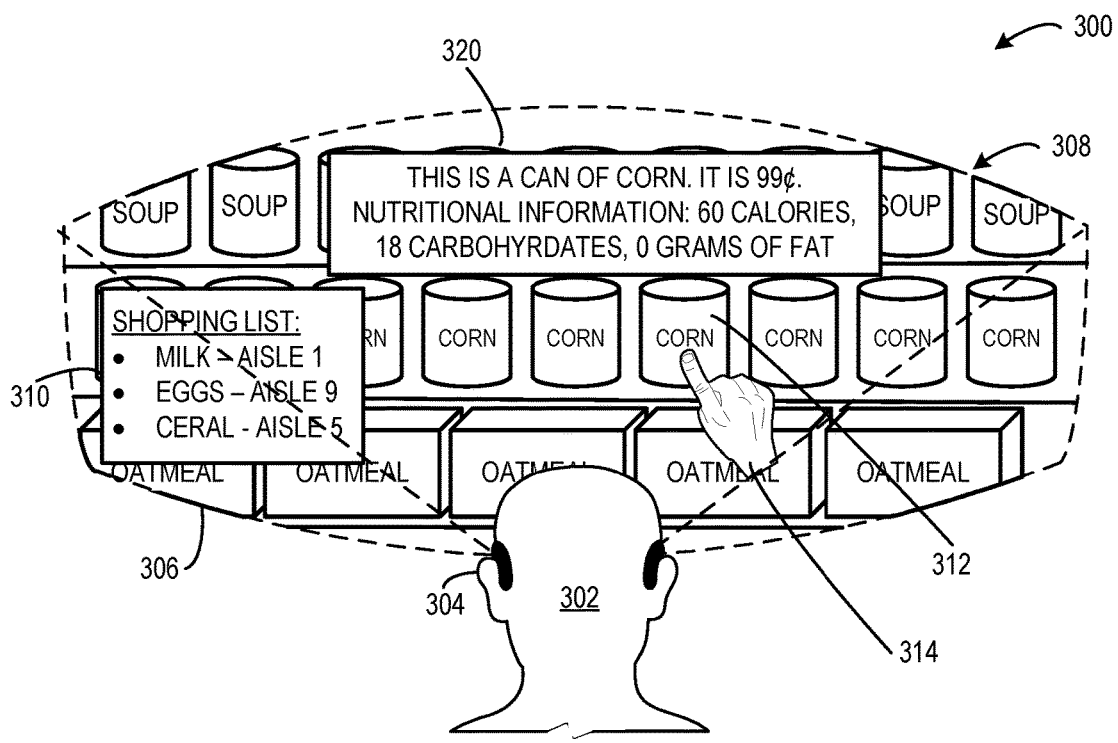
Figure 4:
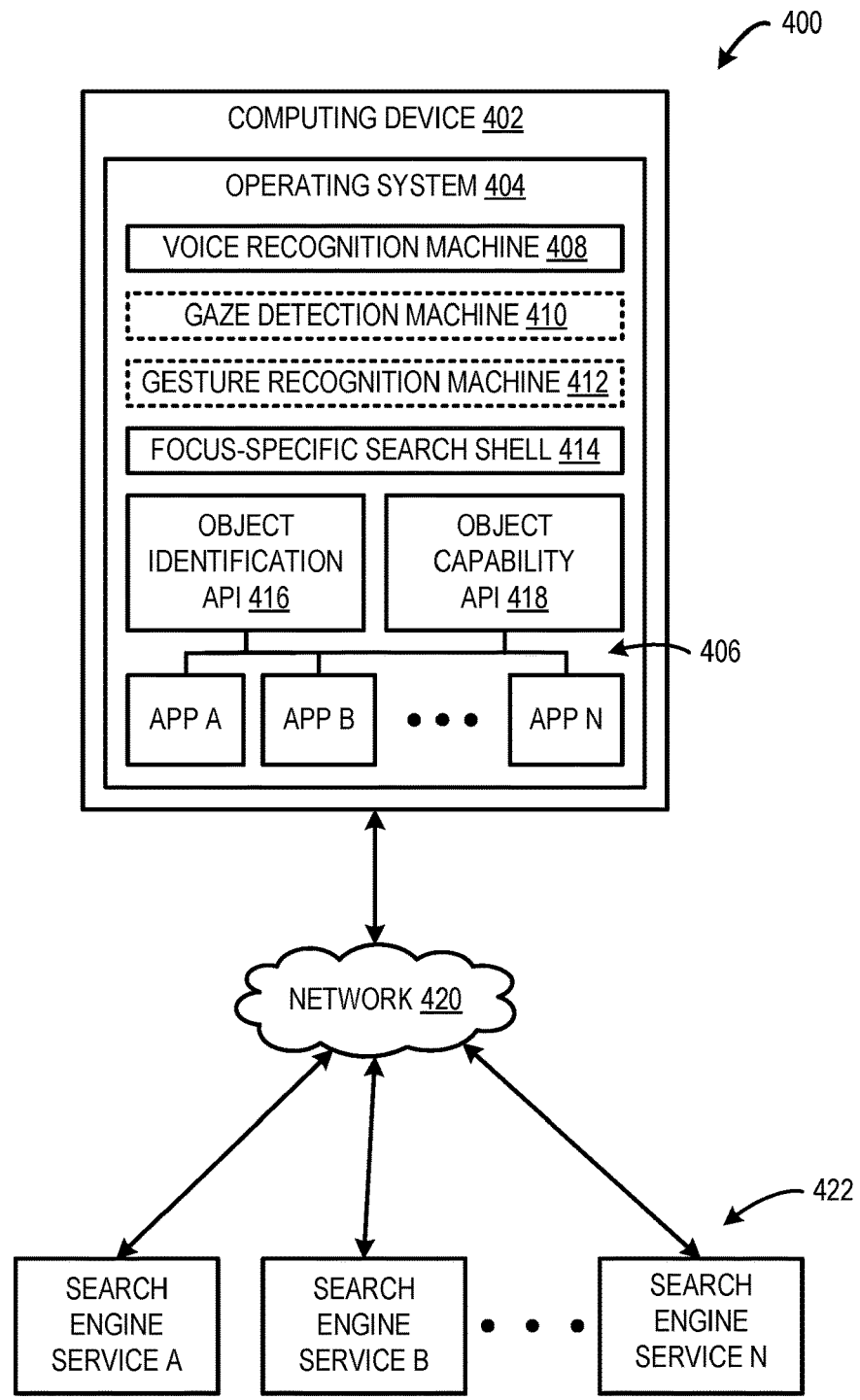
FIG. 4 shows a computing device configured to perform a focus-specific search query.

FIGS. 3A and 3B show a scenario in which a search query pronoun is mapped to an object of user focus based on a gesture performed by a user. In particular, FIGS. 3A and 3B show a real-world environment (or physical space) 300 in which a user (or wearer) 302 is wearing an augmented-reality computing device 304 in the form of a head-mounted, see-through display device. The augmented-reality computing device 304 provides the user 302 with an at least partially see-through field of view (FOV) 306. Because the augmented-reality computing device 304 is mounted on the user's head, the FOV 306 of the real-world environment 300 may change as a pose of the user's head changes.

The augmented-reality computing device 304 may be configured to visually present augmented-reality images to the user 302 in the FOV 306. These augmented-reality images may be visually presented by various display componentry of device 304. As such, display light of the augmented-reality computing device 304 may be directed to cause presentation of augmented-reality images that are not actually present in environment 300. In these implementations, such display light may be directed to the user eye while light from the real-world environment 300 passes through the augmented-reality computing device 304 to the user eye. As such, the user eye simultaneously receives ambient light from the real-world environment 300 and display light from the at least partially see-through display.

In the depicted scenario, the real-world environment 300 is a grocery store including a plurality of real-world objects 308 (e.g., cans of soup, cans of corn, boxes of oatmeal) that may be visible to the user 302 within the FOV 306 of the augmented-reality computing device 304. Furthermore, the plurality of real-world objects 308 may be visible to other users in the real-world environment 300 that are not using an augmented-reality computing device to view the real-world environment 300. In this scenario, the user 302 is using an augmented-reality shopping application to aid the user 302 in purchasing groceries at the grocery store. As shown in FIG. 3B, the augmented-reality shopping application visually presents a virtual shopping list 310 including different items and a corresponding location of the items in the grocery store. The user 302 may refer to the virtual shopping list 310 while the user 302 moves about the grocery store in order to find the items on the virtual shopping list 310.

In FIG. 3A, the user 302, while in the midst of shopping, finds a real-world item 312 (i.e., a can of corn) that the user 302 does not know about. As such, the user 302 wants to learn more about the item. The user 302 signals this desire by pointing to the real-world item 312 with a finger 314 and by providing voice input 316 to device 304. In particular, the user 302 says "WHAT IS THAT?" and this voice input 316 is picked up by a microphone of the device 304. The augmented-reality computing device 304 is further configured to translate the voice input 316 into a machine-understandable representation. Such translation allows the device 304 to identify a sentence in the form of a question, and further to parse the sentence into words in order to determine a pronoun 318 associated with the voice input 316. In particular, the augmented-reality computing device 304 identifies the pronoun "THAT" from the voice input 316.

Furthermore, the augmented-reality computing device 304 determines an object of user focus when the voice input 316 is received by the augmented-reality computing device 304. In this example, the augmented-reality computing device 304 is configured to track the user's movements and recognize a gesture performed by the user 302. In the depicted example, the user 304 performs a pointing gesture with finger 314. The augmented-reality computing system 304 is configured to identify the real-world items 312 as the object of user focus based on the pointing gesture.

In one example, the virtual-reality computing device 102 identifies the real-world item 312 via a gesture recognition machine. In particular, the augmented-reality computing device 304 may include an outward-facing optical system configured to image the real-world environment 300. The gesture recognition machine may be configured to analyze one or more images provided by the outward-facing optical system and recognize that the finger 314 pointing at the real-world item 312 is a gesture indicating an object of user focus. The augmented-reality computing device 304 may be configured to recognize an object of user focus based on other physical interactions such as touching, picking up, holding, or other physical contact of a real-world object. Such interactions may be considered gestures for the purposes described herein.

Once the real-world item 312 is determined to be the object of user focus, the augmented-reality computing device 304 may be configured to perform additional analysis to identify the real-world item 312. In one example, the augmented-reality computing device 304 sends an image of the real-world item 312 as a query to an image search database, and the image search database may return one or more identifying tags or other identifying information for the real-world item 312. In another example, if the real-world item 312 has a visual identifier, such as a bar code or SKU, then the augmented-reality computing device may send an image of the visual identifier to a search engine or product database, and the search engine or product database may return identify information for the real-world item 312.

In some implementations, the augmented-reality computing device 304 may be configured to identify the real-world item 312 as the object of user focus further based on it being the user's gaze target. In other implementations, the augmented-reality computing device 304 may be configured to prioritize the pointing gesture over the user's gaze target when determining the object of user focus. For example, the user 302 may point to the real-world item 312 and ask "WHAT IS THAT" after the user's gaze has moved away from the real-world item 312 to a different target. In this example, the user 302 intends to learn about the real-world item 312 as indicated by the pointing gesture even though the user 302 is not gazing at the real-world item 312.

In some implementations, the augmented-reality computing device 304 may be configured to identify the real-world item 312 as the object of user focus further based one or more context parameters. For example, the augmented-reality computing device 304 may be configured to recognize that the user 302 is in the grocery store based on a location of the user 302 (e.g., determined via an on-board GPS sensor). The augmented-reality computing device 304 may use this location-based context information to infer that an object of user focus is more likely to be a grocery item. Note that the augmented-reality computing device 304 may make different inferences about the object of user focus based on the user 302 being in different locations. For example, the augmented-reality computing device 304 may make different inferences about the object of user focus based on the user 302 being at home, work, at a restaurant, at a museum, at a baseball game, etc. In another example, the augmented-reality computing device 304 may infer that since the user is currently using an augmented-reality shopping application (i.e., it is the application of user focus), then the object of user focus is more likely to be a grocery item.

Furthermore, in some implementations, device 304 may be configured to generate focus-specific search queries based on the context parameter such that the searches are narrowed based on the context. For example, device 304 can infer that when user 302 looks at the can of corn, user 302 is interested in the price of the can of corn and other shopping related information in addition to what it is based on user 302 being in the grocery store. Accordingly, device 304 can generate focus-specific search queries that are influenced by the grocery store and shopping contexts.

Once the object of user focus is determined to be the real-world item (e.g., the can of corn) 312, the augmented-reality computing device 304 maps the pronoun (e.g., "THAT") 318 to the determined object of user focus, generates one or more focus-specific search queries for the object of user focus, executes the one ore focus-specific search queries, and receives the results of the executed focus-specific search queries. In FIG. 3B, the augmented-reality computing device 304 visually presents, in the field of view 306, the results of the one or more focus-specific search queries in the form of a virtual object 320 overlaid on the real-world environment 300. The virtual object 320 includes text that states, "THIS IS A CAN OF CORN. IT IS 99 ¢, NUTRITIONAL INFORMATION: 60 CALORIES, 18 CARBOHYRDATES, 0 GRAMS OF FAT." The al object 320 may include any suitable information about the can of corn 312 to inform the user 302. For example, the virtual object 320 may include one or more recipes that include the ingredient corn. The virtual object 320 may be positioned in the FOV 306 so as not to occlude the virtual shopping list 310 or the real-world item 312 that is the object of user focus. In this way, the information about the object of user focus may be visually presented in a minimally intrusive manner that does not interfere with the user's shopping experience.

It will be appreciated that the focus-specific search querying concepts described herein may be broadly applicable to user interactions with any suitable type of computing device having voice recognition capabilities. FIG. 4 schematically shows an example computing environment 400 in which a computing device 402 is configured to perform a focus-specific search query. The computing device 402 includes an operating system 404 configured to manage various functions of the computing device 402, such as scheduling tasks, executing applications, controlling communication with remote computing devices and peripherals, etc. For example, the operating system 404 may be configured to execute a plurality of different applications 406 (e.g., application A, application B, application N). The plurality of applications 406 may take any suitable form.

The computing device 402 may include a voice recognition machine 408 configured to translate voice input received from a user into a machine-understandable representation. Further, the voice recognition machine 408 may be configured to parse the voice input to identify sentences, questions, and parts-of-speech, such as pronouns. In particular, the voice recognition machine 408 may be used, among other operations, to identify a pronoun in voice input that may be mapped to an object of user focus to perform a focus-specific search query. Further, the voice recognition machine 408 may be configured to identify an implicit pronoun or a part-of-speech that is a proxy for a pronoun and interpret it as a pronoun. The voice recognition machine 408 may include any suitable hardware componentry (e.g., microphone) and/or software componentry to receive and translate the voice input. In some implementations, various voice recognition operations may be performed by a remote computing system, and such operations may be managed by the voice recognition machine 408.

The computing device 402 optionally may include a gaze detection machine 410 configured to track a user's gaze and identify a user's gaze target based on the user's gaze. When included, the gaze detection machine 410 may be used, among other operations, to identify an object of user focus when performing a focus-specific search query. The gaze detection machine 410 may include any suitable hardware componentry (e.g., inward-facing optical system, outward-facing optical system) and/or software componentry to track a user's gaze.

The computing device 402 optionally may include a gesture recognition machine 412 configured to identify one or more gestures performed by a user during interaction with the computing device 402. The gesture recognition machine 412 may be used, among other operations, to identify an object of user focus when performing a focus-specific search query. The gesture recognition machine 412 may include any suitable hardware componentry (e.g., outward-facing optical system) and/or software componentry to identify a gesture.

The computing device 402 includes a focus-specific search shell 414 executed by the operating system 404 at the platform-level such that it is executed separate from any particular application of the plurality of applications 406. The focus-specific search shell 414 is configured to provide focus-specific search querying functionality across the plurality of applications 406. In particular, the focus-specific search shell 414 may initiate a focus-specific search query based on the voice recognition machine 408 receiving voice input including an identified pronoun. Further, in some implementations, the focus-specific search shell 414 may be configured to initiate a focus-specific search query based on receiving text-based input including an identified pronoun, such as from a keyboard or other user input device. For example, such text-based user input may be received in scenarios where a user does not want to provide voice input, such as in a quiet library setting. The focus-specific search shell 414 is configured to map the identified pronoun to an object of user focus and generate one or more focus-specific search queries for the object of user focus.

In one example, the focus-specific search shell 414 determines the object of user focus based on a current application of user focus (e.g., the application with which the user is currently interacting). In particular, the focus-specific search shell 414 requests the name (or other identifier) of the current object of user focus from the application via an object identification application programing interface (API) 416. The focus-specific search shell 414 replaces the identified pronoun with the returned name of the object of user focus in a focus-specific search query. Further, the focus-specific search shell 414 can request context parameters and/or additional contextual information about the object of user focus from the application via an object context API 418. The contextual information may include attributes, capabilities, use-cases, and other characteristics of the object of user focus. The contextual information may further include information about the application of user focus beyond the object of user focus. The focus-specific search shell 414 may user the context information to disambiguate the object of user focus and/or influence (e.g., narrow) the focus-specific search queries. When included, the gaze detection machine 410 and/or the gesture recognition machine 412 additionally or alternatively may be used by the focus-specific search shell 414 to identify the object of user focus. In some implementations, user input via one or more user-input devices, such as a keyboard, mouse, touch screen, active stylus, game controller, etc. may be used by the focus-specific search shell 414 to identify the object of user focus. For example, the focus-specific search shell 414 may identify an object of user focus based on user input from a user input device in the form of placement of a cursor on a displayed object and/or selection of a displayed object.

The focus-specific search shell 414 sends one or more focus-specific search queries to one or more of a plurality of remote search engine service computing systems 420 (e.g., search engine service A, search engine service B, search engine service N) via a network 420, such as the Internet. The plurality of search engines service computing systems 420 may be configured to perform any suitable type of searching including text search, image search, video search, audio search, etc. When the search results are returned from the search engines 422, the focus-specific search shell 414 renders the results as an overlay on a view of the application of user focus so as to minimally disrupt the user's engagement with the application of user focus. In some implementations, the focus-specific search shell 414 may present the results of the focus-specific search query in audio form, via speakers of the computing device 402.

Figure 5:
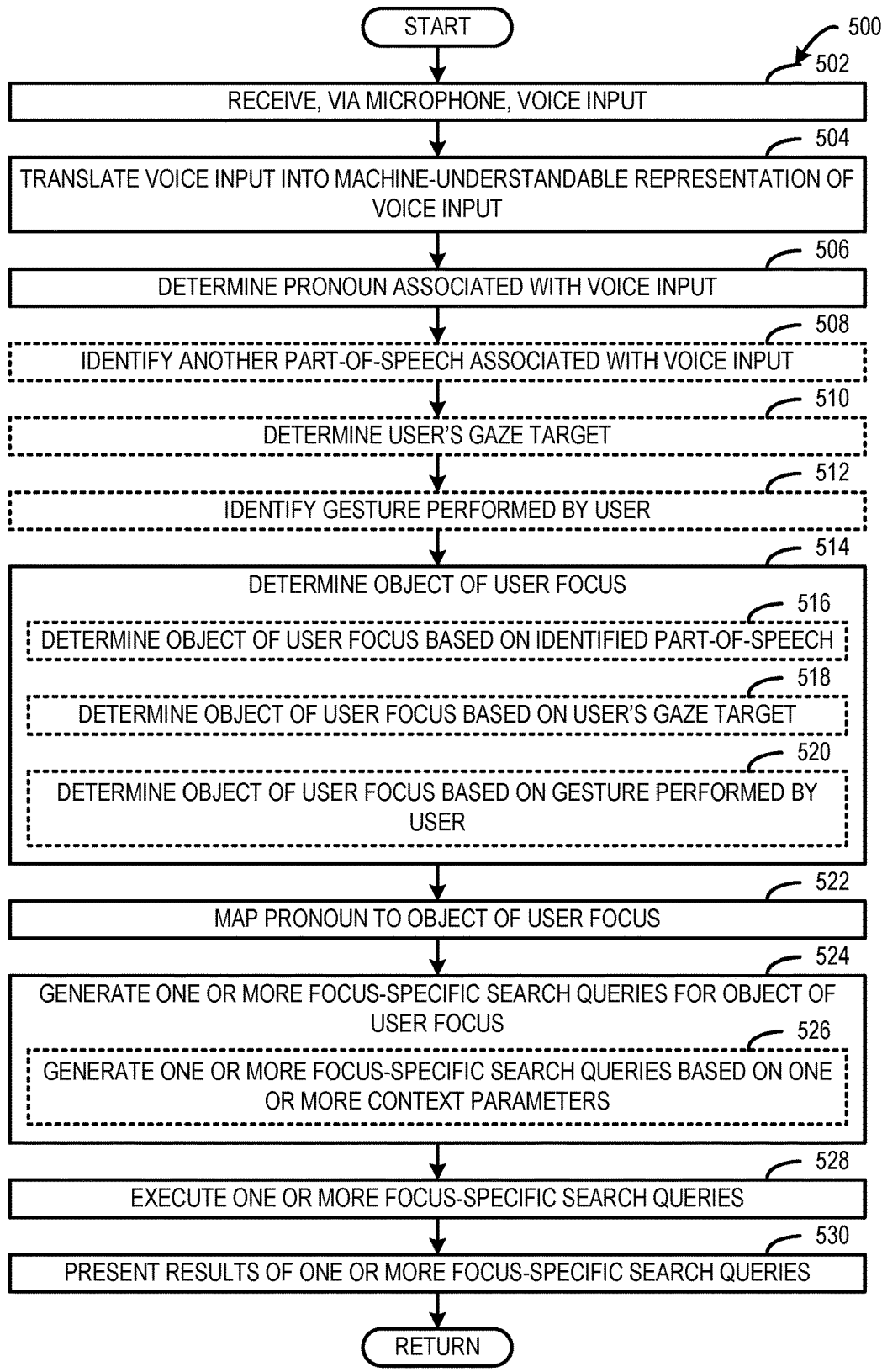
FIG. 5 shows a method for performing a focus-specific search query.

FIG. 5 shows a method 500 for performing a focus-specific search query. For example, the method 500 may be performed by the virtual-reality computing device 102 of FIGS. 1A, 1B, 2A and 2B, the augmented-reality computing device 304 of FIGS. 3A and 3B, the computing device 402 of FIG. 4, the head-mounted computing system 600 of FIG. 6, and the computing system 700 of FIG. 7. At 502, the method 500 includes receiving, via a microphone, voice input. At 504, the method 500 includes translating the voice input into a machine-understandable representation of the voice input. At 506, the method 500 includes determining a pronoun associated with the voice input. Alternatively or additionally, in some implementations, the method 500 may include receiving a text-based search query, and determining that the text-based search query includes the pronoun.

In some implementations, at 508, the method 500 optionally may include identifying another part-of-speech associated with the voice input. In some implementations, at 510, the method 500 optionally may include determining a users gaze target. In some implementations, at 512, the method 500 optionally may include identifying a gesture performed by the user.

At 514, the method 500 includes determining an object of user focus. In some implementations, at 516, the method 500 optionally may include determining the object of user focus based on the identified part-of-speech associated with the voice input. The identified part-of-speech may be used to disambiguate the object of user focus as well narrow a focus-specific search query. In some implementations, at 518, the method 500 optionally may include determining the object of user focus based on the user's gaze target. In some implementations, at 520, the method 500 optionally may include determining the object of user focus based on the identified gesture performed by the user.

At 522, the method 500 includes mapping the pronoun to an object of user focus. At 524, the method includes generating one or more focus-specific search queries for the object of user focus. In some implementations, the method 500 optionally may include generating one or more focus-specific search queries based on one or more context parameters.

At 528, the method 500 includes executing; the one or more focus-specific search queries. At 530, the method 500 includes presenting the results of the one or more focus-specific search queries.

By performing a focus-specific search query in which a pronoun is replaced by an inferred object of user focus, more targeted information may be returned from the focus-specific search that the user may find more useful.

Figure 6:
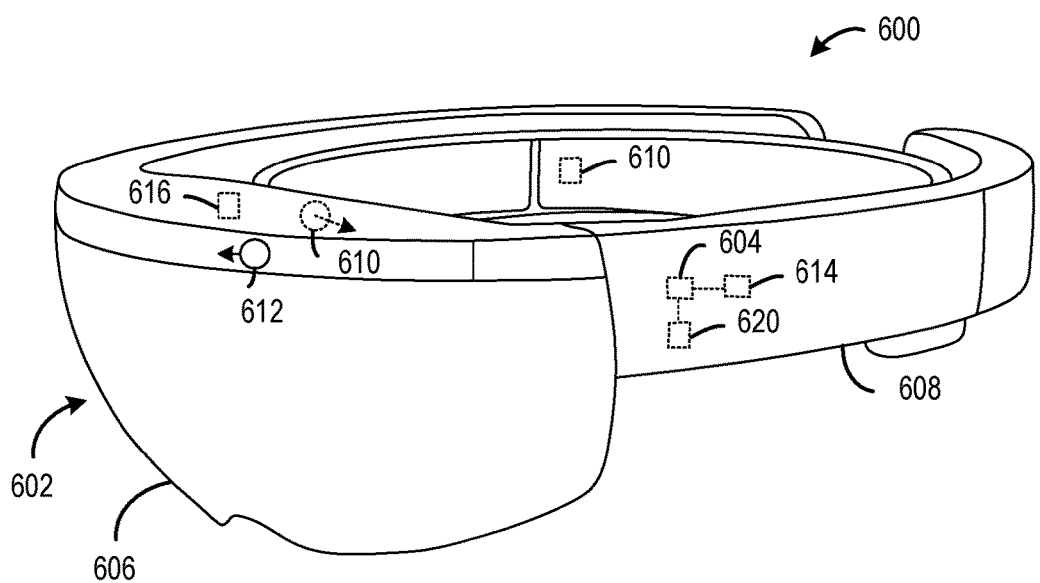
FIG. 6 shows a head-mounted, near eye display device.

FIG. 6 shows aspects of a head-mounted computing system 600 including a near-eye display 602. The head-mounted computing; system 600 is a non-limiting example of the virtual-reality computing device 102 shown in FIGS. 1A, 1B, 2A, and 2B, the augmented-reality computing device 304 shown in FIGS. 3A and 3B, the computing device 402 shown in FIG. 4 and/or the computing system 700 shown in FIG. 7.

The head-mounted computing system 600 may be configured to present a virtual-reality experience in which the near-eye display 602 is opaque, such that the wearer is completely absorbed in the virtual-reality imagery provided via the near-eye display 602.

The head-mounted computing system 600 may be configured to present an augmented-reality experience in which the near-eye display 602 is wholly or partially transparent from the perspective of the wearer, to give the wearer a clear view of a surrounding physical space. In such a configuration, the near-eye display 602 is configured to direct display light to the user's eye(s) so that the user will see augmented-reality objects that are not actually present in the physical space.

In such augmented-reality implementations, the head-mounted computing system 600 may be configured to visually present augmented-reality objects that appear body-locked and/or world-locked. A body-locked augmented-reality object may appear to move along with a perspective of the user as a pose (e.g., 6 degrees of freedom (DOF): x, y, z, yaw, pitch, roll) of the head-mounted computing system 600 changes. As such, a body-locked, augmented-reality object may appear to occupy the same portion of the near-eye display 602 and may appear to be at the same distance from the user, even as the user moves in the physical space. On the other hand, a world-locked, augmented-reality object may appear to remain in a fixed location in the physical space, even as the pose of the head-mounted computing system 600 changes.

In some implementations, the opacity of the near-eye display 602 is controllable dynamically via a dimming filter. A substantially see-through display, accordingly, may be switched to full opacity for a fully immersive virtual-reality experience.

The head-mounted computing system 600 may take any other suitable form in which a transparent, semi-transparent, and/or non-transparent display is supported in front of a viewer's eye(s). Further, implementations described herein may be used with any other suitable computing device, including but not limited to mobile computing devices, laptop computers, desktop computers, tablet computers, other wearable computers, etc.

Any suitable mechanism may be used to display images via the near-eye display 602. For example, the near-eye display 602 may include image-producing elements located within lenses 606. As another example, the near-eye display 602 may include a display device, such as a liquid crystal on silicon (LCOS) device or OILED microdisplay located within a frame 608. In this example, the lenses 606 may serve as, or otherwise include, a light guide for delivering light from the display device to the eyes of a wearer. Additionally or alternatively, the near-eye display 602 may present left-eye and right-eye virtual-reality images via respective left-eye and right-eye displays.

The head-mounted computing system 600 includes an on-board computer 604 configured to perform various operations related to receiving, from a touch-sensitive device, control signals that are based on touch input to the touch-sensitive device, visual presentation of mixed-reality images including virtual objects via the near-eye display 602 based on the control signals, and other operations described herein.

The head-mounted computing system 600 may include various sensors and related systems to provide information to the on-board computer 604. Such sensors may include, but are not limited to, an inward-facing optical system 610 including one or more inward facing image sensors, an outward-facing optical system 612 including one or more outward facing image sensors, and an inertial measurement unit (IMU) 614. The inward-facing optical system 610 may be configured to acquire gaze tracking information from a wearer's eyes. In other implementations, a different type of gaze detector/sensor may be employed to measure one or more gaze parameters of the user's eyes.

The outward-facing optical system 612 may be configured to measure physical environment attributes of a physical space. In one example, the outward-facing optical system 612 includes a visible-light camera configured to collect a visible-light image of a physical space and a depth camera configured to collect a depth image of a physical space.

Data from the outward-facing optical system 612 may be used by the on-board computer 604 to detect movements, such as gesture-based inputs or other movements performed by a wearer or by a person or physical object in the physical space. In one example, data from the outward-facing optical system 612 may be used to detect a wearer input performed by the wearer of the head-mounted computing system 600, such as a gesture. Data from the outward-facing optical system 612 may be used by the on-board computer 604 to determine direction/location/orientation data and/or a pose (e.g., from imaging environmental features) that enables position/motion tracking of the head-mounted computing system 600 in the real-world environment. In some implementations, data from the outward-facing optical system 612 may be used by the on-board computer 604 to construct still images and/or video images of the surrounding environment from the perspective of the head-mounted computing system 600.

The IMU 614 may be configured to provide position and/or orientation data of the head-mounted computing system 600 to the on-board computer 604. In one example implementation, the IMU 614 may be configured as a three-axis or three-degree of freedom (3DOF) position sensor system. This example position sensor system may, for example, include three gyroscopes to indicate or measure a change in orientation of the head-mounted computing system 600 within 3D space about three orthogonal axes (e.g., roll, pitch, and yaw).

In another example, the IMU 614 may be configured as a six-axis or six-degree of freedom (6DOF) position sensor system. Such a configuration may include three accelerometers and three gyroscopes to indicate or measure a change in location of the head-mounted computing system 600 along three orthogonal spatial axes (e.g., x, y, and z) and a change in device orientation about three orthogonal rotation axes (e.g., yaw, pitch, and roll). In some implementations, position and orientation data from the outward-facing optical system 612 and the IMU 614 may be used in conjunction to determine a position and orientation (or 6DOF pose) of the head-mounted computing system 600.

The head-mounted computing system 600 may also support other suitable positioning techniques, such as UPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., Wi-Fi antennas/interfaces etc.

The head-mounted computing system 600 includes a microphone 616 configured to receive audio data, such as voice input, from the wearer of the head-mounted computing system 600. The microphone 616 may be used to detect voice input that includes a pronoun that may be mapped to an object of user focus in order to perform a focus-specific search query.

The head-mounted computing system 600 includes a loud speaker 618 configured to present audio information to the wearer of the head-mounted computing system 600. For example, the loud speaker 618 may audibly present results of a focus-specific search query.

The head-mounted computing system 600 may include a communication interface 620 configured to communicate with one or more other computing devices, such as a remote search engine service. The communication interface 620 may include any suitable communication componentry including wired and/or wireless communication devices compatible with one or more different communication protocols/standards (e.g., Bluetooth).

The on-board computer 604 may include a logic machine and a storage machine, discussed in more detail below with respect to FIG. 7, in communication with the near-eye display 602 and the various sensors of the head-mounted computing system 600.

Figure 7:
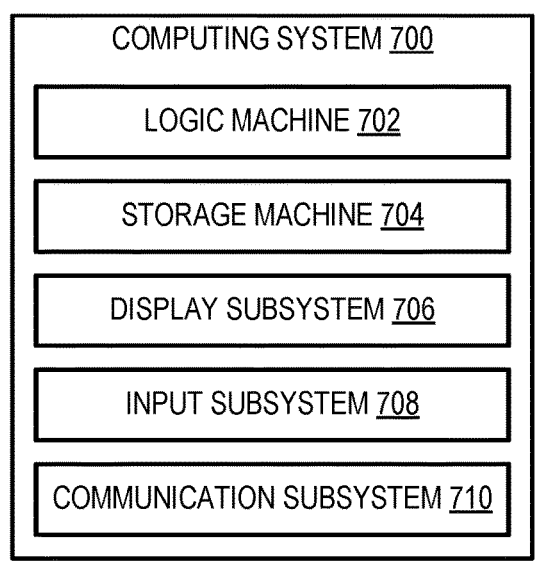
FIG. 7 shows a computing system.

FIG. 7 schematically shows a non-limiting implementation of a computing system 700 that can enact one or more of the methods and processes described above. Computing system 700 is shown in simplified form. Computing system 800 may take the form of one or more personal computers, server computers, tablet computers, home-entertainment computers, network computing devices, gaming devices, mobile computing devices, mobile communication devices (e.g., smart phone), mixed-reality devices, touch-sensitive devices, and/or other computing devices. For example, the computing system 700 may be a non-limiting example of the virtual-reality computing device 102 of FIGS. 1A, 1B, 2A, and 2B, the augmented-reality computing device 304 of FIGS. 3A and 3B, and/or the head-mounted computing system 600 of FIG. 6.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 702 may include one or more processors configured to execute software instructions. Additionally or alternatively, the logic machine 702 may include one or more hardware or firmware logic machines configured to execute hardware or firmware instructions. Processors of the logic machine 702 may be single-core or multi-core, and the instructions executed thereon may be configured for sequential, parallel, and/or distributed processing. Individual components of the logic machine 702 optionally may be distributed among two or more separate devices, which may be remotely located and/or configured for coordinated processing. Aspects of the logic machine 702 may be virtualized and executed by remotely accessible, networked computing devices configured in a cloud-computing configuration.

Storage machine 704 includes one or more physical devices configured to hold instructions executable by the logic machine 702 to implement the methods and processes described herein. When such methods and processes are implemented, the state of storage machine 704 may be transformed e.g., to hold different data.

Storage machine 704 may include removable and/or built-in devices. Storage machine 704 may include optical memory e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices. As a non-limiting example, display subsystem 706 may include the near-eye displays described above.

When included, input subsystem 708 may comprise or interface with one or more user-input devices such as a keyboard, mouse, touch screen, active stylus, touch input device, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem 710 may allow computing system 700 to send and/or receive messages to and/or from other devices via a network such as the Internet.

In an example, a computing device comprises a logic machine, and a storage machine holding instructions. The instructions are executable by the logic machine to receive a machine-understandable representation of voice input, determine a pronoun associated with the voice input, map the pronoun to an object of user focus, generate one or more focus-specific search queries for the object of user focus, execute the one or more focus-specific search queries, and present the results of the one or more focus-specific search queries. In this example and/or other examples, the instructions may be further executable by the logic machine to determine a user's gaze target, and the object of user focus may be determined based on the user's gaze target. In this example and/or other examples, the user's gaze target may intersect a virtual object visually presented via a display, and the virtual object may be determined to be the object of user focus. In this example and/or other examples, the user's gaze target may intersect a real-world object in a physical space, and the real-world object may be determined to be the object of user focus. In this example and/or other examples, the instructions may be further executable by the logic machine to identify a gesture performed by a user, and the object of user focus may be determined based on the gesture performed by the user. In this example and/or other examples, one or both of the mapping and generating may be further based on a context parameter. In this example and/or other examples, the context parameter may include a part-of-speech identified in the voice input. In this example and/or other examples, the context parameter may include a location of the computing device. In this example and/or other examples, the context parameter may include an application executed by the computing device that has a user's focus. In this example and/or other examples, the application may be configured to visually present a graphical user interface, and the instructions may be further executable by the logic machine to present the results of the one or more focus-specific search queries as an overlay that at least partially overlaps the graphical user interface.

In an example, a method of focus-specific search querying performed by a computing device, comprises receiving a machine-understandable representation of voice input, determining a pronoun associated with the voice input, mapping the pronoun to an object of user focus, generating one or more focus-specific search queries for the object of user focus, executing the one or more focus-specific search queries, and presenting the results of the one or more focus-specific search queries. In this example and/or other examples, the method may further comprise determining a user's gaze target, and the object of user focus may be determined based on the user's gaze target. In this example and/or other examples, the method may further comprise identifying a gesture performed by a user, and the object of user focus may be determined based on the gesture performed by the user. In this example and/or other examples, one or both of the mapping and generating may be further based on a context parameter. In this example and/or other examples, the context parameter may include at least one of a part-of-speech identified in the voice input, a location of the computing device, and an application executed by the computing device and having a user's focus.

In an example, a computing device comprises a near-eye display, a gaze detection machine configured to determine a wearer's gaze target on the near-eye display, a microphone configured to receive voice input of the wearer, a logic machine, and a storage machine holding instructions. The instructions are executable by the logic machine to receive, via the microphone, voice input, translate the voice input into a machine-understandable representation of the voice input, determine a pronoun associated with the voice input, determine, via the gaze detection machine, an object of wearer focus based on the wearer's gaze target, map the pronoun to the object of wearer focus, generate one or more focus-specific search queries for the object of wearer focus, execute the one or more focus-specific search queries, and present the results of the one or more focus-specific search queries. In this example and/or other examples, the near-eye display may be opaque, and the object of wearer focus may be a virtual object visually presented via the near-eye display. In this example and/or other examples, the near-eye display may be at least partially see-through, the computing system may further comprise an optical system configured to image a physical space, and the object of wearer focus may be a real-world object in the physical space that intersects the wearer's gaze target. In this example and/or other examples, the near-eye display may be at least partially see-through, the computing device may further comprise an optical system configured to image a physical space, a gesture recognition machine configured to identify a gesture performed by the wearer based on one or more images provided by the optical system; and the instructions may be further executable by the logic machine to identify, via the gesture recognition machine, a gesture performed by the wearer, and identify the object of wearer focus as a real-world object in the physical space from one or more images provided by the optical system based on the identified gesture. In this example and/or other examples, one or both of the mapping and generating may be further based on a context parameter including at least one of a part-of-speech identified in the voice input, a location of the computing device, and an application executed by the computing device that has the wearer's focus.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a logic machine; and
a storage machine holding instructions executable by the logic machine to:
receive a machine-understandable representation of voice input;
identify a pronoun and a part-of-speech other than the pronoun associated with the voice input;
map the pronoun to an object of user focus based at least on the pronoun and the part-of-speech identified in the voice input;
generate one or more focus-specific search queries for the object of user focus based at least on the part-of-speech identified in the voice input;
execute the one or more focus-specific search queries; and
present the results of the one or more focus-specific search queries.

2. The computing device of claim 1, wherein the instructions are further executable by the logic machine to:
determine a user's gaze target; and
wherein the object of user focus is determined based on the user's gaze target.

3. The computing device of claim 2, wherein the user's gaze target intersects a virtual object visually presented via a display, and wherein the virtual object is determined to be the object of user focus.

4. The computing device of claim 2, wherein the user's gaze target intersects a real-world object in a physical space, and wherein the real-world object is determined to be the object of user focus.

5. The computing device of claim 1, wherein the instructions are further executable by the logic machine to:
identify a gesture performed by a user; and
wherein the object of user focus is determined based on the gesture performed by the user.

6. The computing device of claim 1, wherein one or both of the mapping and generating are further based on a context parameter.

7. The computing device of claim 6, wherein the context parameter includes a location of the computing device.

8. The computing device of claim 6, wherein the context parameter includes an application executed by the computing device that has a user's focus.

9. The computing device of claim 8, wherein the application is configured to visually present a graphical user interface, and wherein the instructions are further executable by the logic machine to:
present the results of the one or more focus-specific search queries as an overlay that at least partially overlaps the graphical user interface.

10. A method of focus-specific search querying performed by a computing device, comprising:
receiving a machine-understandable representation of voice input;
identifying a pronoun and at least a part-of-speech other than the pronoun associated with the voice input;
mapping the pronoun to an object of user focus based at least on the pronoun and the part-of-speech identified in the voice input;
generating one or more focus-specific search queries for the object of user focus based at least on the part-of-speech identified in the voice input;
executing the one or more focus-specific search queries; and
presenting the results of the one or more focus-specific search queries.

11. The method of claim 10, further comprising:
determining a user's gaze target; and
wherein the object of user focus is determined based on the user's gaze target.

12. The method of claim 10, further comprising:
identifying a gesture performed by a user; and
wherein the object of user focus is determined based on the gesture performed by the user.

13. The method of claim 10, wherein one or both of the mapping and generating are further based on a context parameter.

14. The method of claim 13, wherein the context parameter includes at least one of a location of the computing device, and an application executed by the computing device and having a user's focus.

15. A computing device, comprising:
a near-eye display;
a gaze detection machine configured to determine a wearer's gaze target on the near-eye display;
a microphone configured to receive voice input of the wearer;
a logic machine; and
a storage machine holding instructions executable by the logic machine to:
receive, via the microphone, voice input;
translate the voice input into a machine-understandable representation of the voice input;
identify a pronoun and a part-of-speech other than the pronoun associated with the voice input;
determine, via the gaze detection machine, an object of wearer focus based on the wearer's gaze target;
map the pronoun to the object of wearer focus;
generate one or more focus-specific search queries for the object of wearer focus based at least on the part-of-speech identified in the voice input;
execute the one or more focus-specific search queries; and
present the results of the one or more focus-specific search queries.

16. The computing device of claim 15, wherein the near-eye display is opaque, and wherein the object of wearer focus is a virtual object visually presented via the near-eye display.

17. The computing device of claim 15,
wherein the near-eye display is at least partially see-through;
wherein the computing system further comprises an optical system configured to image a physical space; and
wherein the object of wearer focus is a real-world object in the physical space that intersects the wearer's gaze target.

18. The computing device of claim 15,
wherein the near-eye display is at least partially see-through;
wherein the computing device further comprises:
an optical system configured to image a physical space;
a gesture recognition machine configured to identify a gesture performed by the wearer based on one or more images provided by the optical system; and
wherein the instructions are further executable by the logic machine to:
identify, via the gesture recognition machine, a gesture performed by the wearer; and
identify the object of wearer focus as a real-world object in the physical space from one or more images provided by the optical system based on the identified gesture.

19. The computing device of claim 15, wherein one or both of the mapping and generating are further based on a context parameter including at least one of a location of the computing device and an application executed by the computing device that has the wearer's focus.

* * * * *